Aug. 16, 1938.    O. A. CLARK    2,127,441
SWEEP RAKE
Filed Dec. 14, 1936
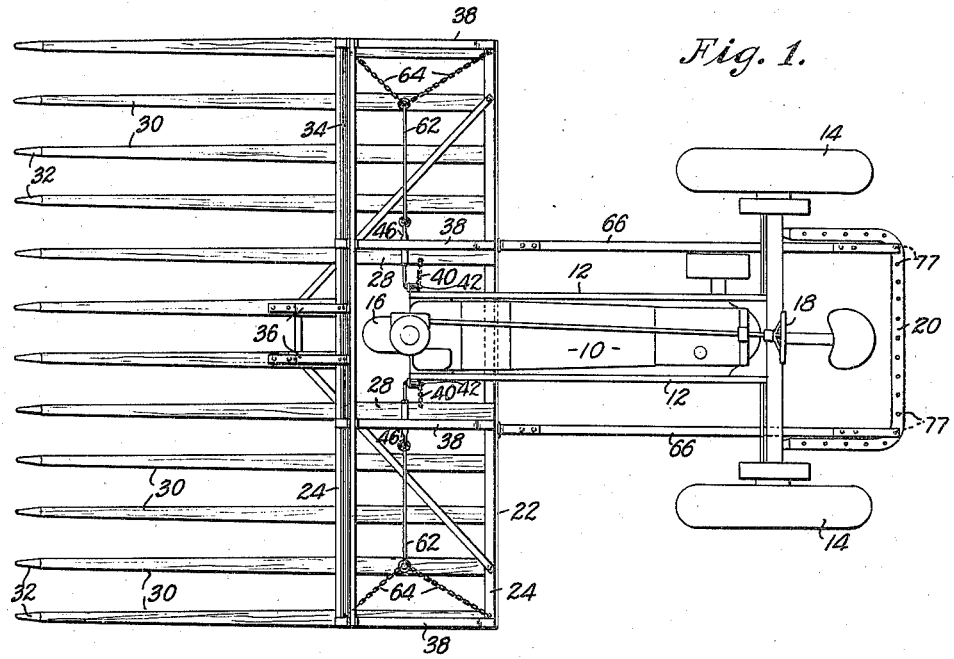
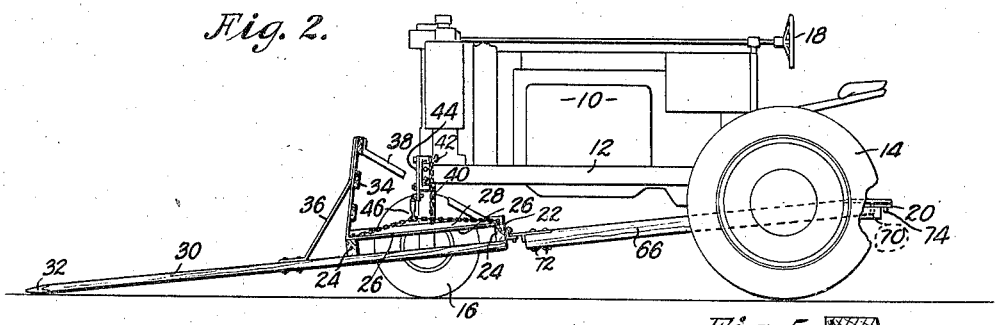
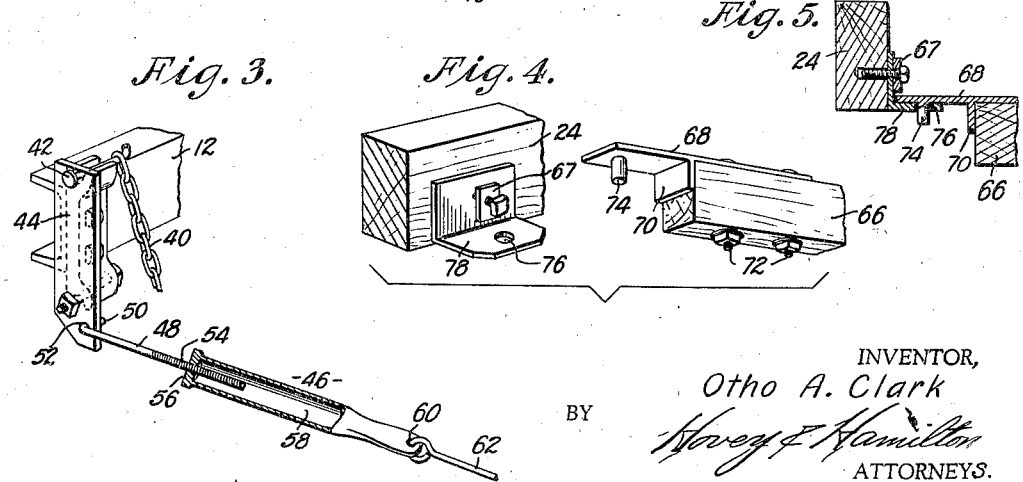
INVENTOR,
Otho A. Clark
BY
ATTORNEYS.

Patented Aug. 16, 1938

2,127,441

UNITED STATES PATENT OFFICE 2,127,441

SWEEP RAKE

Otho A. Clark, Atherton, Mo., assignor of one-third to O. D. Hughes, Independence, Mo.

Application December 14, 1936, Serial No. 115,755

7 Claims. (Cl. 56—27)

This invention relates to improvements in sweep rakes and particularly to sweep rakes adapted for use with tractors.

The principal object of the invention is the provision of sweep rakes, so constructed and equipped as to be supported and propelled by a tractor with the front guide wheel of the tractor positioned forward of the rear edge of said rake frame.

A further object of the present invention is the provision of a sweep rake having a frame with forwardly extending teeth, which may be easily and quickly attached to and detachable from a tractor having a frame and a front guide wheel.

Other objects are simplicity and economy of construction, ease and rapidity of attaching, and efficiency of operation.

With these and other objects, which will appear during the course of the specification in view, reference will now be had to the drawing, wherein:

Figure 1 is a plan view of a tractor with a sweep rake attached, embodying this invention.

Fig. 2 is a side elevation of the device shown in Fig. 1.

Fig. 3 is an enlarged, perspective view of a portion of the tractor frame, with a part of the sweep rake securing means attached.

Fig. 4 is an enlarged, perspective view of a portion of the rake frame and a portion of one of the push arms with the connecting attachments shown in disengaged relation, and, Fig. 5 is an enlarged, sectional view, showing the connection between the push bar and the rake frame.

In the drawing, numeral 10 designates a tractor, having a frame 12 mounted on a pair of rear wheels 14, and a front guide wheel 16. This guide wheel is adapted to be controlled by the operator through steering wheel 18, and interconnecting parts, some of which are not shown. The rear portion of the frame or draw bar 20, may be of any of the various types. This tractor is of a well known type now in general use.

The sweep rake comprises a frame 22, having longitudinal, transverse bars 24, joined together by means of end strips 26 and intermediate members 28. Securely attached to the under side of bars 24, is a series of spaced-apart, substantially parallel teeth 30, which extend forwardly from the frame 22 a sufficient distance to serve as gatherers and carriers of the hay.

To protect the outer ends of the teeth, which are preferably made of wood, metal cap points 32 are provided. Extending upwardly from the front edge of frame 22 the full width of the rake, is a rack or back board 34, which serves to hold the hay against backward movement as the load is being gathered and delivered. It will be observed that the center teeth do not extend rearwardly to back bar 24, but are attached to front bar 24 and secured by means of angle braces 36 to the rake, thereby providing a large opening through the rake frame for the reception of guide wheel 16. In turn the rack 34 is braced by angled members 38 to the rear edge of the rake frame.

The rear portion of the sweep rake is supported in a raised position, as clearly shown in Fig. 2, by means of chains 40 that are connected respectively at their one end to members 28 and at their other ends to pin 42 mounted in bracket 44 carried by the front end of tractor frame 12. Pin 42 is bent upwardly to prevent accidental displacement of the chain, and to permit easy attachment.

To prevent undue lateral movement of the rake relative to the tractor, when in use, transversely disposed supporting members 46 are provided to extend from each of brackets 44 to the adjacent outer end of the rake frame.

Supporting members comprise a threaded rod 48, having an angled portion 50 adapted to be inserted through opening 52 formed in bracket 44, while its threaded end 54 co-operates with the internally threaded head 56 of tubular member 58. The outer end of member 58 is flattened and perforated at 60 to receive the end of rod 62. Two chains 64 engage the outer forward end of 62 and are respectively attached to the forward and rear end corners of the rake frame. It will be observed that both sides of the rake frame are supported in like manner and that when the threaded portions of member 46 are properly adjusted, they will function to maintain the rake frame in proper transverse relation to the tractor.

For propelling the rake, push bars 66 are positioned to interconnect the rear side of the rake with the rear portion of the tractor frame. Referring to the detailed views of bar 66, it will be observed that metal member 68, having a rib 70 to engage the end of 66 and secured to 66 by means of bolts 72, is provided with a depending pin 74 which is adapted to be inserted into hole 76 formed in angled bracket 78.

To prevent accidental disengagement of pin 74 from the bracket, an elongated block 67 is positioned above the outer end of 68. Both ends of each of the push bars have a member 68 with depending pins 74. Referring to Figs. 1 and 2, it will be noted that pins 74, at one end of each of the push bars, enter holes 77 formed through the rear portion of the tractor frame or the draw bar carried thereby.

When so mounted, the front ends of the teeth of the sweep rake will rest on the ground at all times, while the rear portion of the teeth with the rake frame will be supported above the ground level, and the push bars will be substantially in alignment with said rake teeth. This structure presents a very compact arrangement, in which the load is positioned very close to the power unit. Furthermore, this rake is very easily coupled to the tractor by simply driving the rubber guide wheel over the rear transverse bar 24 and raising the rear portion of the rake sufficiently to allow attachment of the chains 40 and members 46, after which pins 74 are dropped to position in openings formed in the rear portion of frame 12.

The distance of the rear portion of the rake above the ground may be varied by simply adjusting the chain on pin 42.

While many changes might be made without departing from the spirit of this invention, it is desired to be limited only by the scope of the appended claims.

Having thus described the invention, what is claimed as new and desired to be secured by Letters Patent is:

1. The combination with a tractor having a frame and a front guide wheel, of a sweep rake comprising a frame having a series of forwardly projecting teeth and adapted to be supported adjacent its rear portion to said tractor frame with said front guide wheel positioned forwardly of the rear ends of said rake teeth; and means behind said guide wheel interconnecting said sweep rake and tractor frame to propel said sweep rake as said tractor is moved.

2. The combination with a tractor having a frame and a front guide wheel, of a sweep rake comprising a frame having a series of teeth extending forwardly therefrom and being adapted to receive said tractor guide wheel adjacent the central portion of its frame; means for supporting said rake frame in a raised position to the front end of said tractor frame adjacent said tractor guide wheel; and push arms behind said guide wheel, interconnecting said sweep rake to said tractor frame, said guide wheel being between the rear and forward ends of said teeth.

3. The combination with a tractor having a frame and a front guide wheel, of a sweep rake comprising a frame having a series of teeth extending forwardly therefrom; and having an opening formed therethrough to receive said guide wheel; push arms interconnecting the rear end of said sweep rake to the rear of said tractor frame; means for supporting said rake frame to said tractor frame adjacent said tractor guide wheel; and an adjustable, transversely disposed anchoring means securing each of the outer ends of said rake frame to the front end of said tractor frame each anchoring means comprising a rod, having one end thereof attached to the tractor frame, means for varying the length of the rod, and a pair of outwardly diverging chains attaching the other end of the rod with the two proximal corners of said frame.

4. The combination with a tractor having a frame, and a front guide wheel, of a sweep rake, comprising a frame carrying a series of forwardly extending, spaced-apart teeth and an upwardly projecting rack; means for supporting said rake frame to said tractor frame in a raised position with said front guide wheel positioned intermediate the front and rear ends of said rake teeth; and push arms behind said guide wheel, interconnecting said sweep rake and tractor frame.

5. The combination with a tractor having a frame and a front guide wheel, of a sweep rake comprising a frame having a series of spaced-apart teeth extending forwardly therefrom and a rack extending upwardly from its forward edge, means for supporting said rake frame to the front portion of said tractor frame with said tractor guide wheel circumscribed by the frame and positioned intermediate the front and rear ends of said rake teeth; push arms interconnecting said sweep rake to the rear end of said tractor; and transversely disposed, adjustable anchoring means interconnecting the outer ends of said rake frame to said tractor frame.

6. The combination with a tractor having a frame and a front guide wheel, of a sweep rake comprising a frame having a series of forwardly projecting, spaced-apart teeth and an upwardly projecting rack; flexible means for supporting said rack frame to the front portion of said tractor frame with said front guide wheel circumscribed by the frame and positioned intermediate the front and rear ends of said rake teeth; push bars interconnecting the sweep rake and the rear portion of said tractor; and flexible anchoring means interconnecting the outer ends of said rake frame to the front portion of said tractor frame.

7. The combination with a tractor having a frame, a pair of traction wheels and a guide wheel located on the longitudinal axis of the tractor, of a sweep rake comprising a pair of transversely disposed members, one to one side of the guide wheel and intermediate the traction wheels and guide wheel and one to the other side of the guide wheel; and a plurality of teeth each having one end secured to the first mentioned transverse member and crossing the second mentioned transverse member and secured thereto, certain of said teeth terminating at the second mentioned member to provide clearance for the said guide wheel between the two transverse members.

OTHO A. CLARK.